Dec. 10, 1929.   J. M. MICHELS   1,738,661
MOWING MACHINE
Filed July 9, 1927   3 Sheets-Sheet 1

Inventor:

Dec. 10, 1929.    J. M. MICHELS    1,738,661
MOWING MACHINE
Filed July 9, 1927    3 Sheets-Sheet 2
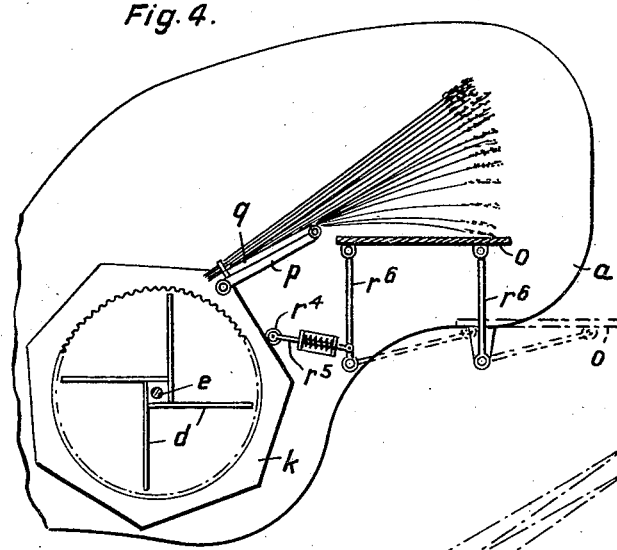
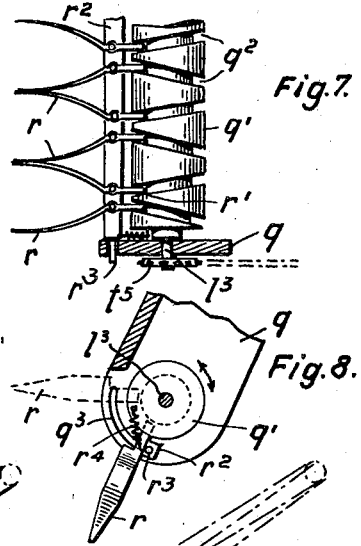
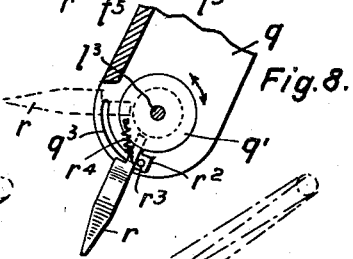
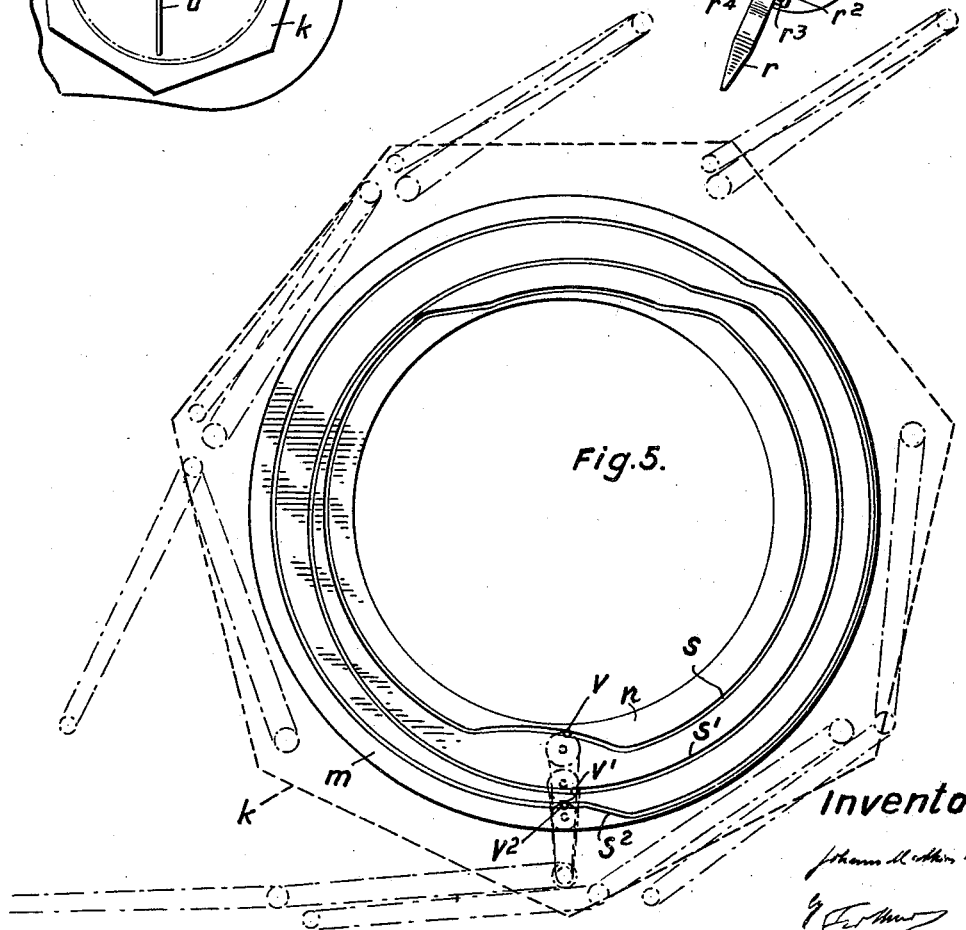
Inventor:

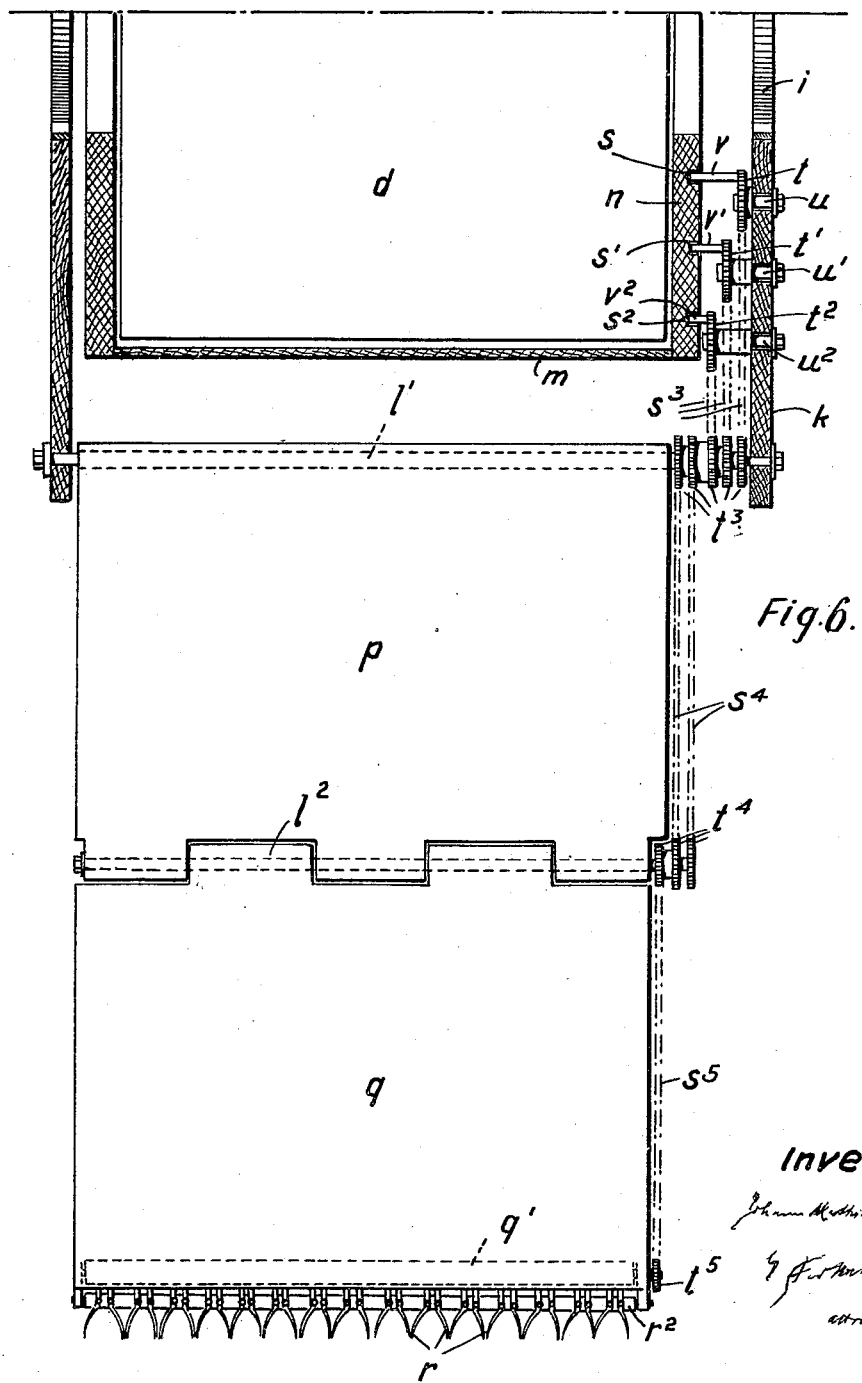

Patented Dec. 10, 1929

1,738,661

UNITED STATES PATENT OFFICE

JOHANN MATHIAS MICHELS, OF BAAK, HOLLAND

MOWING MACHINE

Application filed July 9, 1927, Serial No. 204,612, and in Germany July 13, 1925.

This invention relates to a mowing machine comprising a blower for subdividing the stalks. It has been proposed to separate the stalks to be cut from the others by a blower. This invention has however for its object to make the blower act, after the lifting of the cut stalks, and for disentangling and separating the same.

According to the invention this effect is obtained by continuously elevating the cut-stalks by conveying plates and to expose the same to the action of the blower shortly before they are deposited upon the platform, the air current from the blower passing through two sheaves of cut stalks to disentangle the same and to separate one sheaf from the other. A further characteristic feature of the invention consists in arranging the conveying- or elevating-plates on the circumference of star-wheels or the like, between which the blower drum is situated the outflow opening of which is obliquely directed in upward direction.

An embodiment of the invention is shown, by way of example, in the accompanying drawing in which:—

Fig. 4 shows the star wheel in combination with the mechanism for operating the lifting platform.

Fig. 5 shows the grooves for guiding the pins of the sprocket wheels in their complete length.

Fig. 6 shows how the sprocket wheels are arranged.

Figs. 7 and 8 show details of the means for operating the grippers.

In the side walls $a$ of the mowing machine running on rails $b$ a drum $m$ is fixed which is open at the top end at $c$ and which forms a blower owing to the arrangement of a vane-mechanism $d$, fixed on an axle $e$ rotated in the drum by any suitable driving gear and which throws an air current through the oblique upwardly directed opening $c$ of drum $m$. At either side of the blower drum $m$ rotates a disk or star-wheel $k$, said wheels having several, in the form of construction shown seven corners, and further a toothed crown $i$ meshing with a spur wheel $l$ driven in a suitable manner from the outer side of the machine, said star wheels being slowly rotated around the stationary blower drum in the direction indicated by the arrow lines in Fig. 1. On each of the seven corners of the star wheel $k$ a conveyer-plate $j$ is pivotably mounted which is subdivided into two portions similar to a hay turner, so that the conveying- or elevating-plates circulate at the rotation of the star wheels around the stationary blower drum. The conveying- or elevating-plates $j$ are each composed of a top portion $p$ and of a lower portion $q$ hingedly connected the one with the other and further of steerable gripper-tongs $r$.

Figure 3:
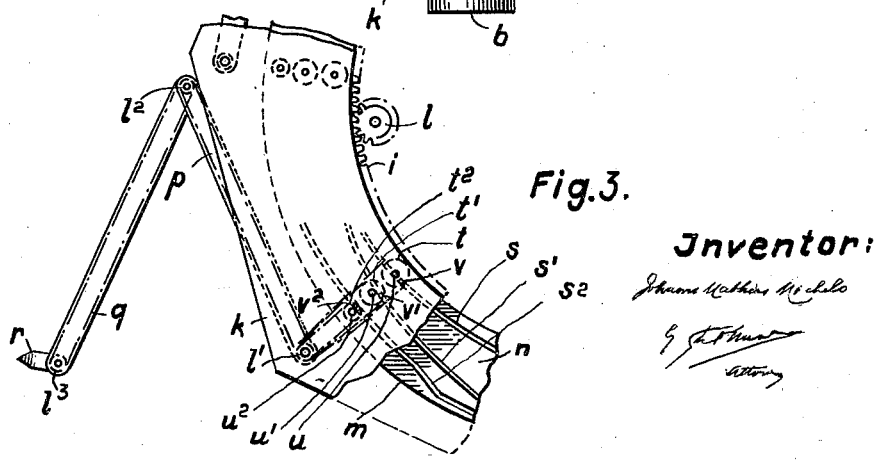
Fig. 3 shows the connection of the grippers with the star wheel and the blower drum on a larger scale.

On the end wall $n$ (Fig. 3) of the stationary blower drum $m$ three rails, grooves or guide bars $s, s^1, s^2$ are arranged at unequal distances from the axle of the drum and being each of a different curvature, while on all these seven corners of the star wheel, between said wall $n$ and the star wheel, three small-size sprocket wheels $t, t^1, t^2$ are arranged the axles $u, u^1, u^2$ of which are journaled in the star wheel. A pin $v, v^1, v^2$ on the rear side of each sprocket wheel $t, t^1, t^2$ respectively engages with the corresponding guide grooves $s^1, s^2$ so that, when the star wheel is rotating, they move along the curves of the guide grooves whereby the sprocket wheels $t, t^1, t^2$ can move to and fro in accordance with the curvature of the grooves or bars $s, s^1, s^2$. The three sprocket wheels $t, t^1$ and $t^2$ (Fig. 6) carry chains $s$ which are guided over sprocket wheels $t^3$ on shaft $l'$, the extreme one of these sprocket wheels $t^3$ being keyed on this shaft to rotate the same, whereby the part $p$ of the conveyer plate $j$ is pivoted. The two other sprocket wheels $t^3$ are mounted on hollow shafts and transmit this rotating movement through sprocket wheels mounted on hollow shafts at the side of the sprocket wheels $l'$ by means of chains $s^4$ onto two sprocket wheels $t^4$ mounted on a shaft $l^2$, the extreme one of these sprocket wheels rotating the shaft $l^2$ and thereby the lower part $q$ of the lifting platform, while the rotation of the sprocket wheel at the side, by means of a sprocket wheel at the side of the same and by means of a chain $s^5$, is transmitted upon a sprocket wheel $t^5$ and thereby upon a shaft $l^3$ and upon the gripper tongs $r$. These gripper tongs $r$ are operated in such a manner that the ends $r'$ (Fig. 7) of the gripper tongs, pivotally mounted on a beam $r^2$ engage with oblique grooves $q^2$ of a control cylinder $q'$ rotatably mounted on an axle $l^3$ in the lower part $q$ of the lifting platform so that, at the rotation of the control cylinder, the gripper tongs $r$ are positively opened and closed. An extension $r^3$ of beam $r^2$ is guided in a slot $q^3$ (Fig. 8) of the part $q$ of the lifting platform and connected by a spiral spring $r^4$ to a control cylinder $q'$ so that, at the rotation of this cylinder, the gripper tongs $r$ are oscillated, as indicated in Fig. 8 in dash dot lines. At the rotation of the sprocket wheel $t^5$ (Fig. 7) on the shaft $l^3$ the gripper tongs $r$ close owing to the rotation of the control cylinder $q'$, as the arms $r'$ of the gripper tongs are spread asunder by the grooves $q^2$. Owing to the connection of the extension $r^3$ of the beam $r^2$ by the spiral spring $r^4$ to the control cylinder $q'$ the beam $r^2$ will pivot around this extension $r^3$ as far as the slot $q^3$ permits and without preventing continuing of the rotation of the control cylinder and further closing of the gripper tongs $r$, so that the gripper tongs have assumed the angular position with regard to the part $q$ of the lifting platform required for the lifting and conveying of the group of stalks. The group of stalks $h$ shows the beginning of the gripping and oscillating movement.

Figure 1:
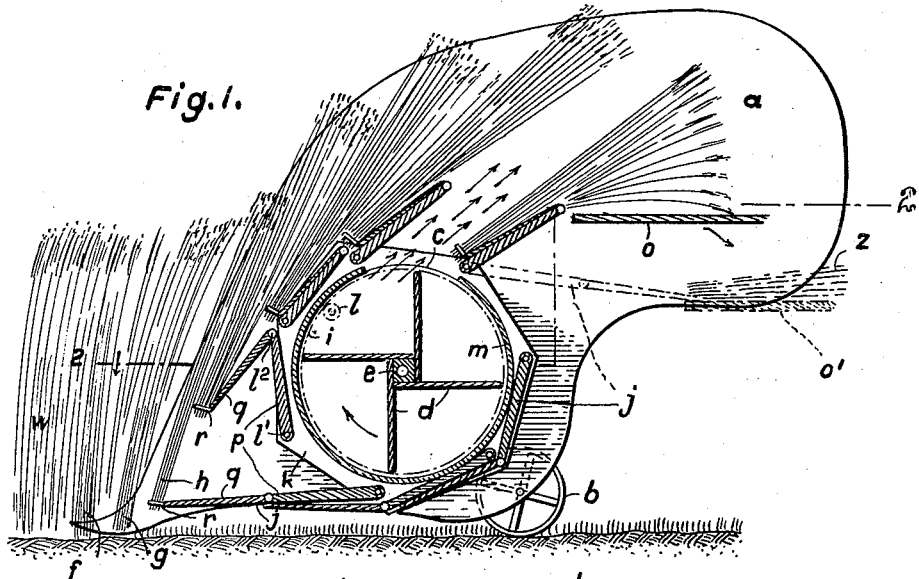
Fig. 1 shows the improved mowing machine in sectional view, the front side wall being omitted.
Figure 2:
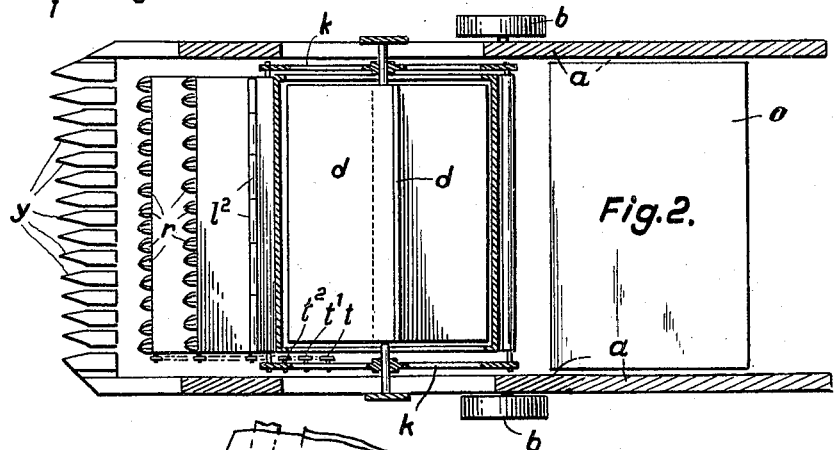
Fig. 2 is partly a top view and partly a section on line 2—2 of Fig. 1.

The operation of the machine is as follows:

The stalks $w$ of the corn, which have penetrated between the fingers $y$ and cut by the knives, have to be separated to groups $f$, $g$, $h$, the one behind the other, as shown in Fig. 1. According to the invention the first group or sheaf $h$ is gripped by the tongs $r$ of the lowermost conveying- or elevating-plate $j$ which is in stretched position, and is elevated, when the rotation of the star wheel continues, around the stationary blower drum by the conveying plate which continues to move with the star wheel. In the course of the continuing rotation of the star wheel the upper and lower portions of the elevating plate are gradually folded over more and more, so that they are finely lying the one on the other. In this position the group $h$ of stalks arrives over the obliquely directed outlet opening $c$ of the blower drum so that it arrives in the range of the air current from the blower $m$, this air current passing through between this group of stalks and the next following group and separates the one group from the other, and disentangles the stalks. The separated group of stalks $h$ is first supported at its upper portion by a movable platform $o$. When the rotation of the star wheel continues the lower portion $q$ of the elevating plate pivots around its pivot pin 12 to assume the stretched position indicated in dash-dot lines, while the platform $o$ continues to move into the position $o^1$ indicated in dot-lines. This being effected, according to Fig. 4, by the cylinder $r^4$ which, rolling on $k$, oscillates at the rotation of $k$ by means of the rods $r^5$, the levers $r^6$ hingedly mounted on the lifting platform $o$ and thereby this platform itself. The whole group $h$ of stalks is thus pushed upon the platform $o^1$ and is well separated from the next following group of stalks. All the tongs $r$ are released at the same time, the group $h$ and the conveying plate $j^1$, in folding over in downward direction, continuing to move in the manner described.

The constructional details of the conveying plates $j$ and of the grippers $r$ are not shown in the drawings to avoid complicating of the same.

A binding apparatus might further be connected to the delivering device so that the delivered sheaves $z$ can be tied up at once. The sheaves may be deposited at the side of the machine to clear the path along which it travels.

I claim:—

1. A mowing machine, comprising in combination with a stationary blower drum having an outlet opening at the top, elevating plates for permanently elevating the cut stalks for bringing the same to said outlet opening of said stationary drum so that a group of stalks is separated by the out-flowing air current from the following stalks the stalks being disentangled at the same time, and a movable platform on which the separated group of stalks is deposited.

2. A mowing machine, comprising in combination with a stationary blower drum having an outlet opening at the top, elevating plates for permanently elevating the cut stalks for bringing the same to said outlet opening of said stationary drum so that a group of stalks is separated by the out-flowing air current from the following stalks the stalks being disentangled at the same time, a movable platform on which the separated group of stalks is deposited, a star wheel on either side of said stationary blower drum and on the circumferences of which said elevating plates are hingedly fixed.

In testimony whereof I affix my signature.

JOHANN MATHIAS MICHELS.